F. M. ULMER.
LOCK VALVE.
APPLICATION FILED JULY 31, 1912.
1,069,744.
Patented Aug. 12, 1913.
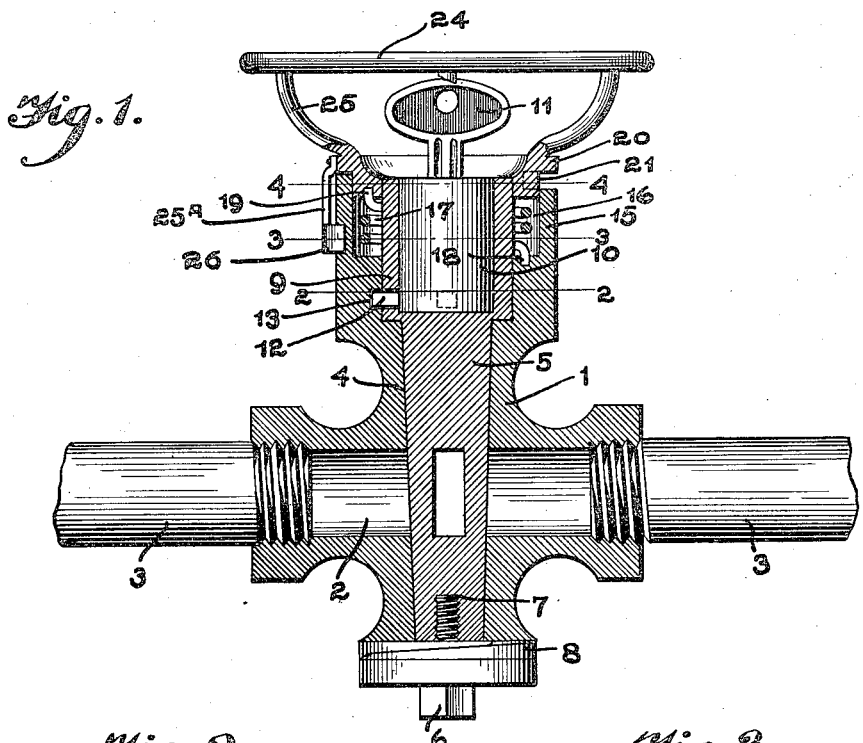
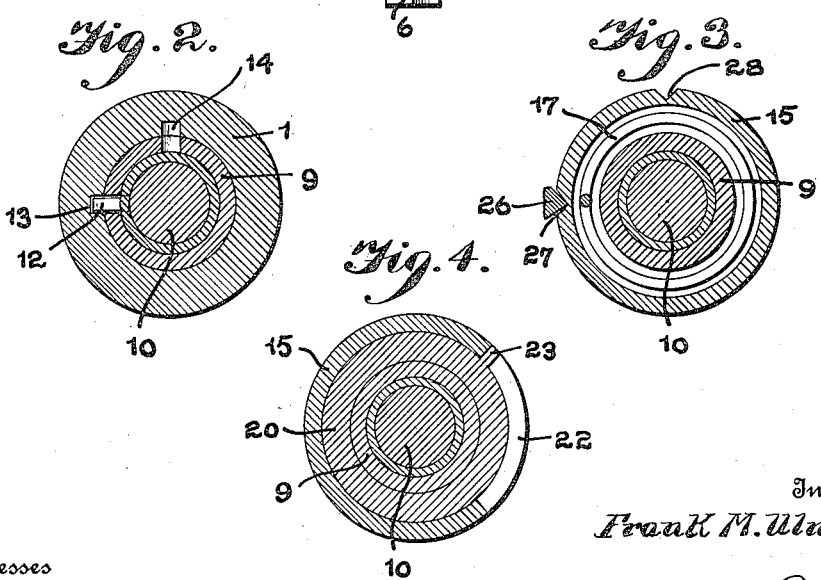

UNITED STATES PATENT OFFICE.

FRANK M. ULMER, OF PHILADELPHIA, PENNSYLVANIA.

LOCK-VALVE.

1,069,744.　　　　　Specification of Letters Patent.　　Patented Aug. 12, 1913.

Application filed July 31, 1912.　Serial No. 712,503.

*To all whom it may concern:*

Be it known that I, FRANK M. ULMER, a citizen of the United States, residing at Philadelphia, in the county of Philadelphia and State of Pennsylvania, have invented certain new and useful Improvements in Lock-Valves, of which the following is a specification.

My invention relates to improvements in lock valves, the object of the invention being to provide a lock valve having a spring normally tending to close the valve, and means for locking the valve in its open as well as its closed position, together with improved means for holding the valve in open position while it is being locked.

A further object is to provide a valve of this character which is designed primarily for use in a line pipe, and which is provided with a lock and a removable key controlling the lock which permits the valve to be locked in either its open or closed position.

With these and other objects in view, the invention consists in certain novel features of construction and combinations and arrangements of parts as will be more fully hereinafter described and pointed out in the claims.

In the accompanying drawings: Figure 1 is a view partly in elevation and partly in longitudinal section illustrating my improved valve in closed position. Fig. 2 is a view in section on the line 2—2 of Fig. 1. Fig. 3 is a view in section on the line 3—3 of Fig. 1, and Fig. 4 is a view in section on the line 4—4 of Fig. 1.

1 represents the valve casing which is provided with a longitudinal bore 2 forming a passage which communicates with pipes 3 screwed into the ends of the casing. This casing 1 has a conical bore 4 in which a conical plug valve 5 is mounted to turn. This valve 5 is secured in place by means of a screw 6 screwed into a threaded socket 7 in the smaller end of the valve, and a spring washer 8 is preferably interposed between the casing and the enlarged head of the screw to exert an elastic pressure on the valve and hold it tight within the casing.

The upper end of the valve is enlarged and of cylindrical shape forming a hollow cylindrical shell 9 in which a lock casing 10 is fixed. This lock casing 10 contains suitable lock mechanism controlled by a removable key 11 which operates a bolt 12 which is projected by the key through the lock casing and through the shell 9 into either of two sockets 13 and 14. These sockets 13 and 14 are located ninety degrees (90°) apart and they are so positioned that they receive the bolt and hold the valve in its open and closed position respectively. The upper end of the casing 1 in which the shell 9 is mounted to revolve, is enlarged appreciably as shown at 15, and is formed with a cylindrical chamber 16 around the shell 9, and in which chamber a coiled spring 17 is located. One end of this coiled spring is projected into a socket 18 in the valve casing, and the other end into a socket 19 in a circular head 20 on the upper end of the valve. This circular head 20 is made with an annular groove 21 so that the head projects over and fits snugly upon the upper edge of the enlarged portion 15 of casing 1. This upper edge of casing 1 is cut away forming a groove 22, and a fixed pin 23 on head 20 moves through this groove 22. The groove 22 is of a length to permit the opening and closing movement of the valve, but the ends of said groove constitute shoulders which are engaged by the pin 23 and limit the turning movement of the valve in both directions. A hand wheel 24 is connected with the head 20 by integral arms 25, and this hand wheel is grasped to turn the valve.

It is to be understood that the spring 17 always tends to turn the valve to closed position, so that it cannot occupy any intermediate position where it would leak. In other words, as soon as the valve begins to close, the spring would compel it to entirely close, and there can be no possibility of leakage. When the valve is turned to open position, it is turned against the tension of the spring 17 and in order to hold the valve in this position so that the key 11 may be manipulated, I provide a spring arm 25ª which is fixed to head 20 and at its free end is provided with a V-shaped lug 26. This lug 26 rides into and out of V-shaped recesses 27 and 28 respectively in the outer face of the enlarged portion 15 of casing 1. While, therefore, the spring arm 25 permits the valve to be readily turned by means of the hand wheel 24, it exerts sufficient engagement with the casing to hold the valve in open position against the action of spring 17 until the valve may be locked by means of the key. This holding action of the arm is readily overcome by a slight movement of the hand wheel, and its pressure or holding force is only sufficient to overcome the spring 17 when the valve is in open position. The spring arm also has the additional function of demonstrating the position of the valve. For example, it shows whether or not the valve is open or closed and when the valve is in closed position, if this spring arm is in the proper notch, it is noticed the valve is tightly closed, otherwise it gives notice the valve is imperfectly operating.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a valve, the combination with a casing having a conical bore and a cylindrical enlargement of two internal diameters, at its upper end, of a conical plug valve mounted to turn in said casing and having an enlarged cylindrical shell at its upper end movable in the smaller diameter of the cylindrical enlargement, a circular head of two diameters fixed to turn with the shell, the smaller diameter of said head fitting the larger diameter of the cylindrical enlargement and the larger diameter of the head located against the end of the enlargement, a coiled spring around the shell and connected at one end to the casing, and at its other end to the head normally holding the valve in closed position, said enlargement having two recesses therein at an angle to each other, a lock in the shell, and a bolt controlled by said lock and adapted to be moved into either of said recesses, to hold the valve in either open or closed position, substantially as described.

2. In a valve, the combination with a casing having an enlarged hollow cylindrical upper end, of a plug valve mounted to turn in said casing and having an enlarged cylindrical upper end movable in the enlarged portion of the casing, a recessed head on the upper end of said valve fitting and closing the upper end of the casing, a coiled spring in the casing around the valve connected at one end to the casing and at the other end to the head, locking means in the hollow valve adapted to lock the valve in either its open or closed position, a spring arm secured to the head and having a V-shaped enlargement at its free end, and said casing in its outer face having V-shaped recesses to receive the enlargement on the arm when the lock is in either its closed or its open position, substantially as described.

In testimony whereof I have signed my name to this specification in the presence of two subscribing witnesses.

FRANK M. ULMER.

Witnesses:
 GEO. W. FRANKLIN,
 R. H. KRENKEL.

Copies of this patent may be obtained for five cents each, by addressing the "Commissioner of Patents, Washington, D. C."